United States Patent
Jiang et al.

(10) Patent No.: US 11,431,996 B2
(45) Date of Patent: *Aug. 30, 2022

(54) DEVICE AND METHOD FOR CODING VIDEO DATA BASED ON ONE OR MORE REFERENCE LINES

(71) Applicant: FG Innovation Company Limited, Tuen Mun (HK)

(72) Inventors: Hui-Yu Jiang, Taipei (TW); Yao-Jen Chang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,462

(22) Filed: Dec. 4, 2020

(65) Prior Publication Data

US 2021/0092422 A1 Mar. 25, 2021

Related U.S. Application Data

(63) Continuation of application No. 16/453,580, filed on Jun. 26, 2019, now Pat. No. 10,893,285.

(Continued)

(51) Int. Cl.
*H04N 11/02* (2006.01)
*H04N 19/44* (2014.01)
(Continued)

(52) U.S. Cl.
CPC ........... *H04N 19/44* (2014.11); *H04N 19/105* (2014.11); *H04N 19/174* (2014.11); *H04N 19/176* (2014.11); *H04N 19/46* (2014.11)

(58) Field of Classification Search
CPC ...................................................... H04N 19/44
(Continued)

(56) References Cited

U.S. PATENT DOCUMENTS 8,472,522 B2 * 6/2013 Matsuo ................ H04N 19/147
375/240.12
10,419,754 B1 9/2019 Zhao et al.
(Continued)

FOREIGN PATENT DOCUMENTS

WO WO-2013064099 A1 * 5/2013 ............... G06T 9/00
WO 2019/184834 A1 10/2019
WO 2019/194950 A2 10/2019

OTHER PUBLICATIONS

Li X et al.: "Description of SDR video coding technology proposal by Tencent", 10. JVET Meeting; Oct. 4, 2018-Apr. 20, 2018; San Diego; (The Joint Video Exploration Team of ISO/IEC JTC1/SC29/WG11 and ITU-TSG.16), No. JVET-J0029, Apr. 3, 2018 (Apr. 3, 2018) XP030151198, Sections 2 . 1 . 3 . 1, 2 .1 . 10 . 4 and 3 . 1 . 3.
(Continued)

*Primary Examiner* — Leron Beck
(74) *Attorney, Agent, or Firm* — ScienBiziP, P.C.

(57) ABSTRACT

A method of decoding a bistream by an electronic device is provided. A block unit is determined from an image frame according to the bitstream. A line index determined in the bitstream is compared with a first predefined value to determine whether a mode flag is included in the bitstream. A mode index is determined for directly selecting a prediction mode of the block unit from a most probable mode (MPM) list of the block unit when the mode flag is not included in the bitstream. The mode flag is compared to a second predefined value when the mode flag is included in the bitstream to determine whether the prediction mode is selected from the MPM list. One of a plurality of reference lines is selected based on the line index. The block unit is reconstructed based on the selected reference line and the prediction mode.

11 Claims, 9 Drawing Sheets

Related U.S. Application Data

(60) Provisional application No. 62/692,175, filed on Jun. 29, 2018.

(51) Int. Cl.
*H04N 19/105* (2014.01)
*H04N 19/176* (2014.01)
*H04N 19/174* (2014.01)
*H04N 19/46* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 2013/0272401 A1* | 10/2013 | Seregin | H04N 19/13 375/240.12 |
| 2014/0161180 A1* | 6/2014 | Kumakura | H04N 19/10 375/240.12 |
| 2017/0347093 A1* | 11/2017 | Yu | H04N 19/42 |
| 2017/0353730 A1* | 12/2017 | Liu | H04N 19/96 |
| 2017/0359595 A1* | 12/2017 | Zhang | H04N 19/587 |
| 2018/0176582 A1* | 6/2018 | Zhao | H04N 19/619 |
| 2019/0306494 A1 | 10/2019 | Chang et al. | |
| 2020/0021805 A1* | 1/2020 | Ko | H04N 19/11 |

OTHER PUBLICATIONS

Van Der Auwera (Qualcomm) G et al.: "Description of Core Experiment 3 (CE3): Intra Prediction and Mode Coding", 122 . MPEG Meeting; Apr. 16, 2018-Apr. 20, 2018; San Diego; (Motion Picture Expert Group or ISO/IEC JTC1/SC29/WG11), No. m42829, Apr. 20, 2018 (Apr. 20, 2018), XP030262019, Sections 7 and 9 with subsections.

\* cited by examiner

DEVICE AND METHOD FOR CODING
VIDEO DATA BASED ON ONE OR MORE
REFERENCE LINES

CROSS-REFERENCE TO RELATED
APPLICATION(S)

This application is a continuation application of U.S. patent application Ser. No. 16/453,580, filed on Jun. 26, 2019 ("the '580 application"), currently pending, which claims the benefit of and priority to a provisional U.S. Patent Application Ser. No. 62/692,175, filed on Jun. 29, 2018 ("the '175 provisional"). The contents of the '580 application and the '175 provisional are fully incorporated herein by reference in their entireties.

FIELD

The present disclosure generally relates to video coding, and more particularly, to techniques for a selection of a prediction mode and a reference line.

BACKGROUND

Intra prediction is a coding tool for video coding. In a conventional video coding method, an encoder and a decoder only use previously reconstructed pixels in a closest pixel line adjacent to a coding block to generate reference pixels and predictors for predicting or reconstructing the coding block along an orientation.

However, the closest pixel line may include a texture of an object different from other objects in the coding block, and/or signal noise. Thus, the encoder can exploit the closest pixel line and other adjacent pixel lines near the closest pixel line to generate the reference pixels and the predictors. When the encoder exploits more than one pixel line to generate the reference pixels and the predictors, the encoder needs to signal a flag indicating the selected reference lines into a bitstream. As a result, it is necessary for the decoder to parse the flag from the bitstream and determine, based on the flag, which of the pixel lines are selected for the coding block.

In addition, the number of predicted results may be too high for the encoder to quickly select an appropriate predicted result, when the encoder selects different reference lines to predict the coding block based on a plurality of intra modes included in a predefined mode list. Thus, the encoder may need different mode lists for different reference lines.

SUMMARY

The present disclosure is directed to a device and method for coding video data based on one or more reference lines.

In a first aspect of the present disclosure, a method for decoding a bitstream by an electronic device and the electronic device for decoding the bitstream by the method are provided. The method comprises determining a block unit from an image frame according to the bitstream; determining a line index of the block unit in the bitstream; comparing the line index with a first predefined value to determine whether a mode flag is included in the bitstream; determining a mode index in the bitstream for directly selecting a prediction mode of the block unit from a most probable mode (MPM) list of the block unit when the mode flag is not included in the bitstream; comparing the mode flag to a second predefined value when the mode flag is included in the bitstream to determine whether the prediction mode is selected from the MPM list based on the mode index; selecting one of a plurality of reference lines based on the line index; and reconstructing the block unit based on the selected one of the plurality of reference lines and the prediction mode.

In a second aspect of the present disclosure, a method for decoding a bitstream by an electronic device and the electronic device for decoding the bitstream by the method are provided. The method comprises determining a block unit from an image frame according to the bitstream; determining a line index in the bitstream for selecting a prediction line of the block unit from a plurality of reference lines; determining, based on the line index. whether a mode flag is included in the bitstream; directly determining a most probable mode (MPM) index from the bitstream for selecting a prediction mode of the block unit from a MPM list of the block unit when the mode flag is not included in the bitstream; comparing the mode flag with a predefined value for selecting one of the MPM index and a non-MPM index to determine the prediction mode when the mode flag is included in the bitstream; and reconstructing the block unit based on the prediction line and the prediction mode.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
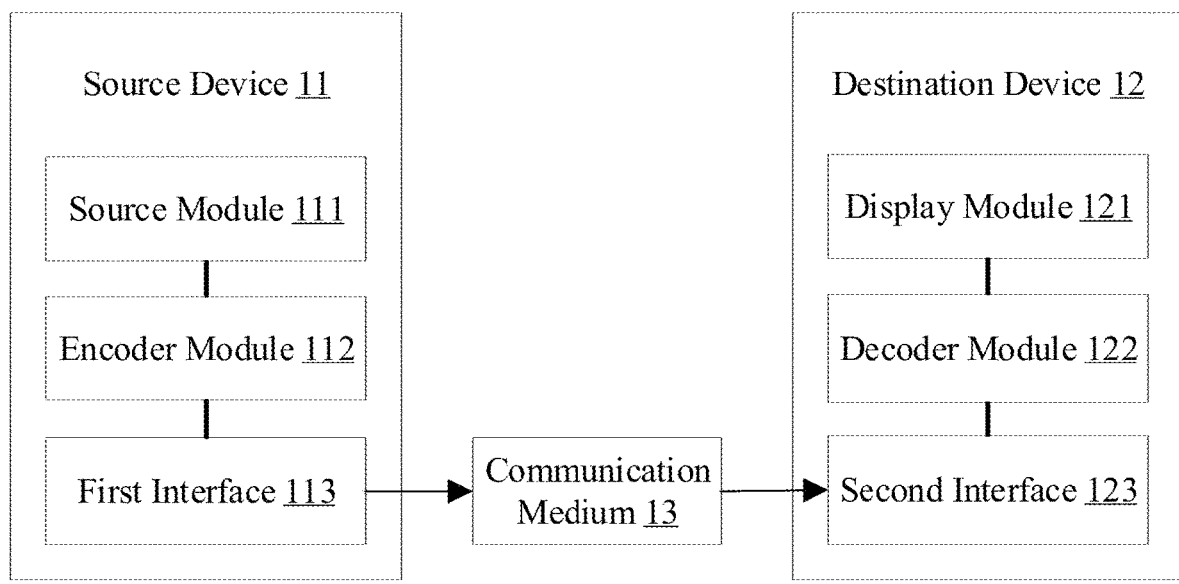
FIG. 1 is a block diagram of an example implementation of a system configured to encode and decode video data according to one or more techniques of the present disclosure.

The following description contains specific information pertaining to example implementations in the present disclosure. The drawings in the present disclosure and their accompanying detailed description are directed to merely example implementations. However, the present disclosure is not limited to merely these example implementations.

Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an example implementation of a system that may be configured to encode and decode video data according to one or more techniques of the present disclosure. In the implementation, the system includes a source device 11, a destination device 12, and a communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic device. FIG. 1 merely illustrates one example of the source device 11 and the destination device 12, and the source device 11 and the destination device 12 in other implementations may include more or less components than illustrated, or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of the present disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chip set supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
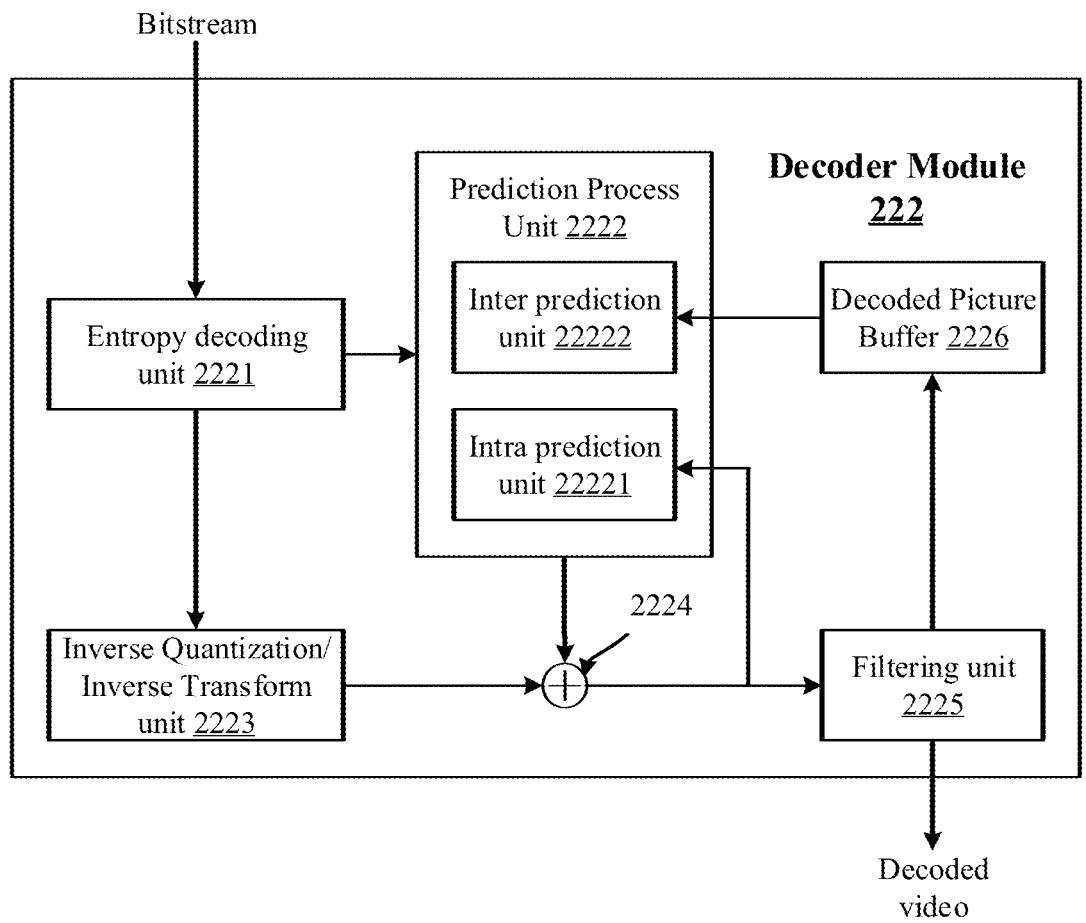
FIG. 2 is a block diagram of an example implementation of a decoder module of the destination device in the system of FIG. 1.

FIG. 2 is a block diagram of a decoder module 222 representing an example implementation of the decoder module 122 of the destination device 12 in the system of FIG. 1. In at least one implementation, the decoder module 222 includes an entropy decoder (e.g., an entropy decoding unit 2221), a prediction processor (e.g., a prediction process unit 2222), an inverse quantization/inverse transform processor (e.g., an inverse quantization/inverse transform unit 2223), a summer (e.g., a first summer 2224), a filter (e.g., a filtering unit 2225), and a decoded picture buffer (e.g., a decoded picture buffer 2226). In at least one implementation, the prediction process unit 2222 of the decoder module 222 further includes an intra prediction processor (e.g., an intra prediction unit 22221) and an inter prediction processor (e.g., an inter prediction unit 22222). In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1, and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 provides the quantized transform coefficients, the quantization parameters, and the transform data to the inverse quantization/inverse transform unit 2223, and provides the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit, when the chroma components of the current block are reconstructed by the prediction process unit 2222.

In at least one implementation, the inter prediction unit 22222 may perform inter-predictive coding of the current block unit relative to one or more blocks in one or more reference image block based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain. In at least one implementation, the inverse transformation may be inversely applied the transformation process, such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
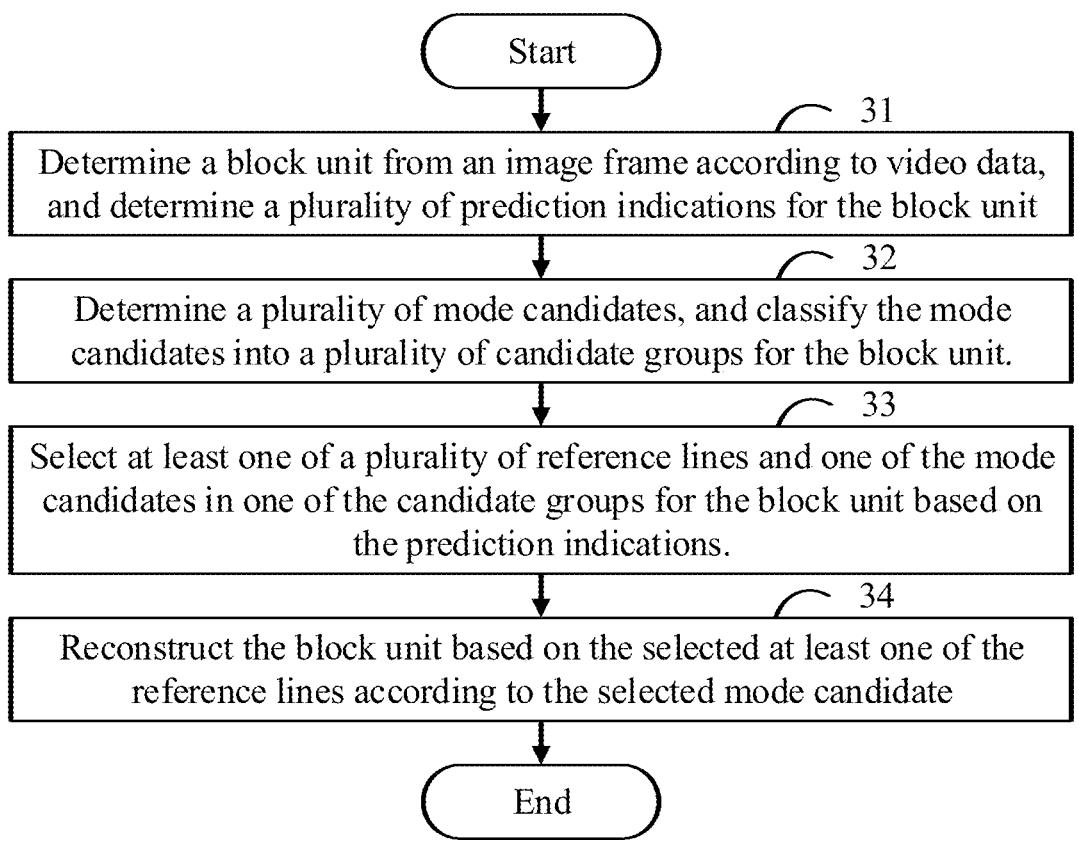
FIG. 3 illustrates a flowchart in accordance with an example implementation of a selection method for selecting a reference line and a prediction mode.

FIG. 3 illustrates a flowchart in accordance with an example implementation of a selection method for selecting a reference line and a prediction mode. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 3 represents one or more processes, methods, or subroutines, carried out in the example method. Furthermore, the order of blocks is illustrative only and may change. Additional blocks may be added or less blocks may be utilized without departing from the present disclosure.

At block 31, the decoder module 222 determines a block unit from an image frame according to video data, and determines a plurality of prediction indications for the block unit.

In at least one implementation, the video data may be a bitstream. In at least one implementation, the destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 32, the intra prediction unit 22221 determines a plurality of mode candidates, and classifies the mode candidates into a plurality of candidate groups for the block unit.

In at least one implementation, the mode candidates may be a plurality of intra prediction modes including a plurality of angular modes, and a plurality of non-angular modes. In the implementation, the candidate groups include a first candidate group and a second candidate group. The intra prediction unit 22221 may add at least one of the mode candidates into the first candidate group, and add the remaining mode candidates into to the second candidate group.

In at least one implementation, the intra prediction unit 22221 may determine a most probable list based on a plurality of predicted results of neighboring blocks neighboring to the block unit 400. The neighboring blocks may be predicted based on the mode candidates, when the neighboring blocks are predicted by an intra prediction method. Thus, the intra prediction unit 22221 may select the mode candidates of the neighboring blocks as a plurality of most probable modes (MPMs) in the most probable list. In at least one implementation, the most probable list including the MPMs may be the first candidate group, and the remaining mode candidates may be added into the second candidate group.

At block 33, the intra prediction unit 22221 selects at least one of a plurality of reference lines and one of the mode candidates in one of the candidate groups for the block unit based on the prediction indications.

Figure 4:
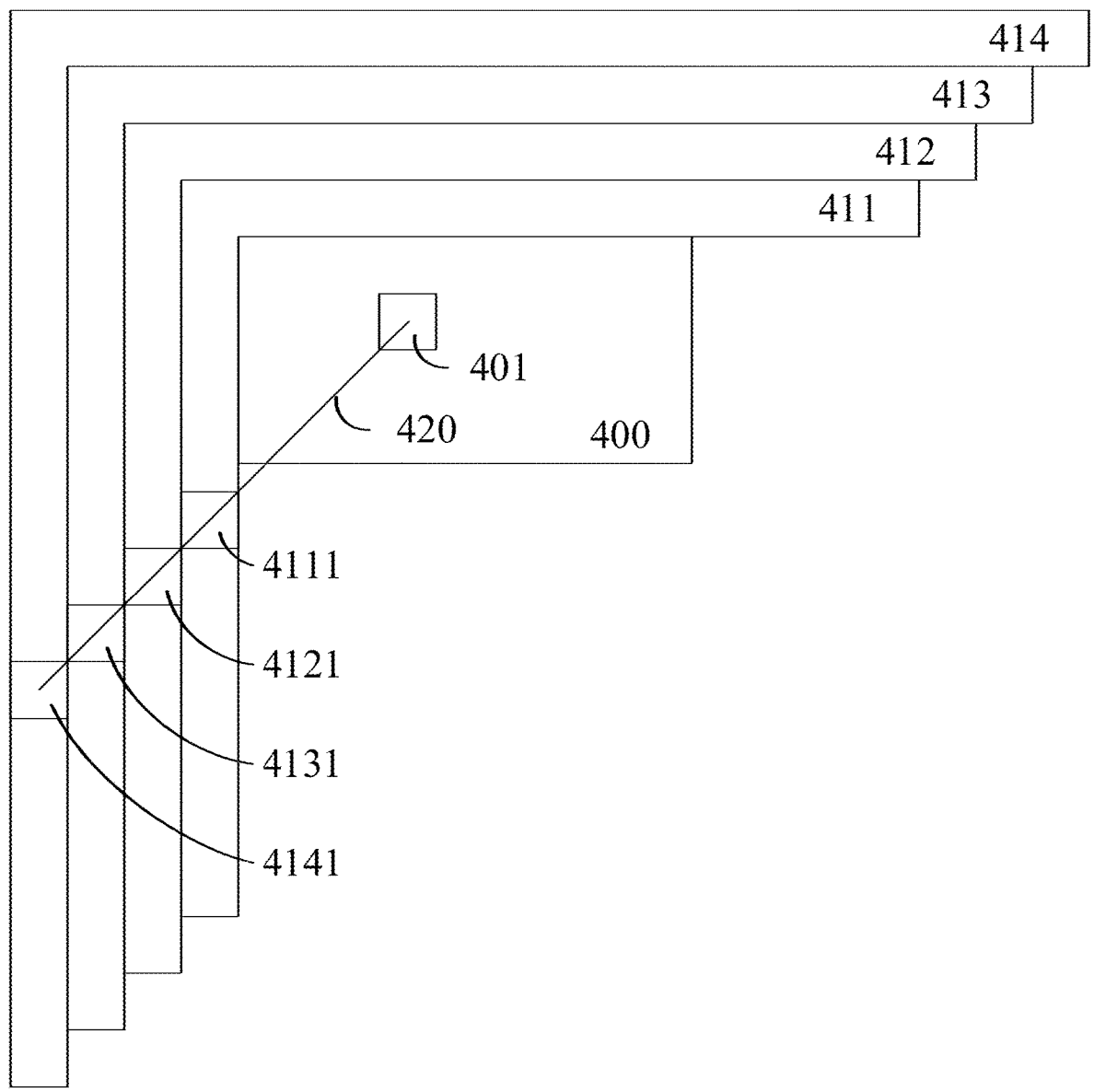
FIG. 4 is a schematic illustration of an example implementation of a block unit and a plurality of reference lines neighboring to a block unit.

In at least one implementation, the prediction process unit 2222 of the destination device 12 determines the block unit from the video data via the entropy decoding unit 2221, and determines the reference lines neighboring with the block unit and having a plurality of line samples. FIG. 4 is a schematic illustration of an example implementation of a block unit 400 and reference lines having line samples, such as line samples 4111, 4121, 4131, and 4141 in a first reference line 411, a second reference line 412, a third reference line 413, and a fourth reference line 414, respectively. In at least one implementation, the block unit 400 includes a plurality of block components, such a first block component 401. In at least one implementation, the intra prediction unit 22221 may generate a predicted component for each of the block components based on some of the line samples selected according to an orientation 420, and the first summer 2224 may generate a plurality of reconstructed components based on the predicted components and a plurality of residual components. In the implementation, the first summer 2224 may receive the residual components of the block unit 400 via the entropy decoding unit 2221 and the inverse quantization/inverse transform unit 2223.

In at least one implementation, the intra prediction unit 22221 may select one of the reference lines, and reconstruct the block unit based on the selected reference line. In at least one implementation, the intra prediction unit 22221 may reconstruct the block unit by one of the mode candidates selected from one of the first candidate group and the second candidate group, when the selected reference line is a first one of the reference lines. In the implementation, the first reference line is the first reference line 411 adjacent to the block unit 400. In at least one implementation, the intra prediction unit 22221 may reconstruct the block unit by one of the mode candidates selected from the first candidate group, when the selected reference line is different from the first one of the reference lines. In at least one implementation, the intra prediction unit 22221 may select more than one of the reference lines, and reconstruct the block unit based on the selected reference lines by one of the mode candidates selected from the first candidate group.

In at least one implementation, the prediction indications may include at least one of an MPM flag, a line index, an MPM index, and a non-MPM index. In the implementation, the MPM flag may indicate whether the selected mode candidate of the block unit is included in the first candidate group. When the selected mode candidate of the block unit is one of the MPMs in the first candidate group, the intra prediction unit 22221 may further determine which one of the mode candidates is the selected mode candidate of the block unit based on the MPM index. When the selected mode candidate of the block unit is one of the non-MPMs in the second candidate group, the intra prediction unit 22221 may further determine which one of the mode candidates is the selected mode candidate of the block unit based on the non-MPM index. In addition, the intra prediction unit 22221 may select the at least one of the reference lines based on the line index.

In at least one implementation, the intra prediction unit 22221 may first determine whether the selected mode candidate of the block unit is one of the MPMs based on the MPM flag, and then determine which one of the mode candidates is the selected mode candidate based on one of the MPM index and the non-MPM index. In at least one implementation, the intra prediction unit 22221 may determine that the selected mode candidate belongs to the first candidate group, when the selected mode candidates is included in the MPM list. Thus, the intra prediction unit 22221 may select at least one of the reference lines for the block unit based on the line index. In at least one implementation, the intra prediction unit 22221 may determine that the selected mode candidate belongs to the second candidate group, when the selected mode candidates is not included in the MPM list. Thus, the intra prediction unit 22221 may directly determine the first reference line as the selected reference line for the block unit. In the implementation, there is no line index for the block unit in the bitstream, when the selected mode candidate belongs to the second candidate group.

In at least one implementation, the intra prediction unit 22221 may first select at least one of the reference lines for the block unit based on the line index. Then, the intra prediction unit 22221 determines which one of the mode candidates is the selected mode candidate based on at least one of the MPM flag, the MPM index, and the non-MPM index. In at least one implementation, the intra prediction unit 22221 determines which one of the mode candidates is the selected mode candidate based on MPM flag and one of the MPM index and the non-MPM index, when the intra prediction unit 22221 selects the first reference line as the selected reference line for the block unit based on the line index. In at least one implementation, the intra prediction unit 22221 may determine that the selected mode candidate is one of the MPMs, when the selected reference line is different from the first reference line 411. In at least one implementation, the selected reference lines include one of the reference lines different from the first reference line 411, when the number of the selected reference lines is greater than one. Thus, the intra prediction unit 22221 may determine that the selected mode candidate is one of the MPMs, when the number of the selected reference lines is greater than one. In the implementation, there is no MPM flag for the block unit in the bitstream, when the selected at least one of the reference lines includes one of the reference lines different from the first reference line 411.

At block 34, the intra prediction unit 22221 reconstructs the block unit based on the selected at least one of the reference lines according to the selected mode candidate.

In at least one implementation, the intra prediction unit 22221 may select, based on the prediction mode, at least one of the line samples in the selected at least one of the reference lines for each of the block components. Then, the intra prediction unit 22221 may generate a plurality of predicted components for the block components. In at least one implementation, the first summer 2224 of the decoder module 222 in the destination device 12 may add the predicted components into a plurality of residual components determined from the bitstream to reconstruct the block unit. In addition, the decoder module 222 may reconstruct all of the other block units in the image frame for reconstructing the image frame and the video.

Figure 5:
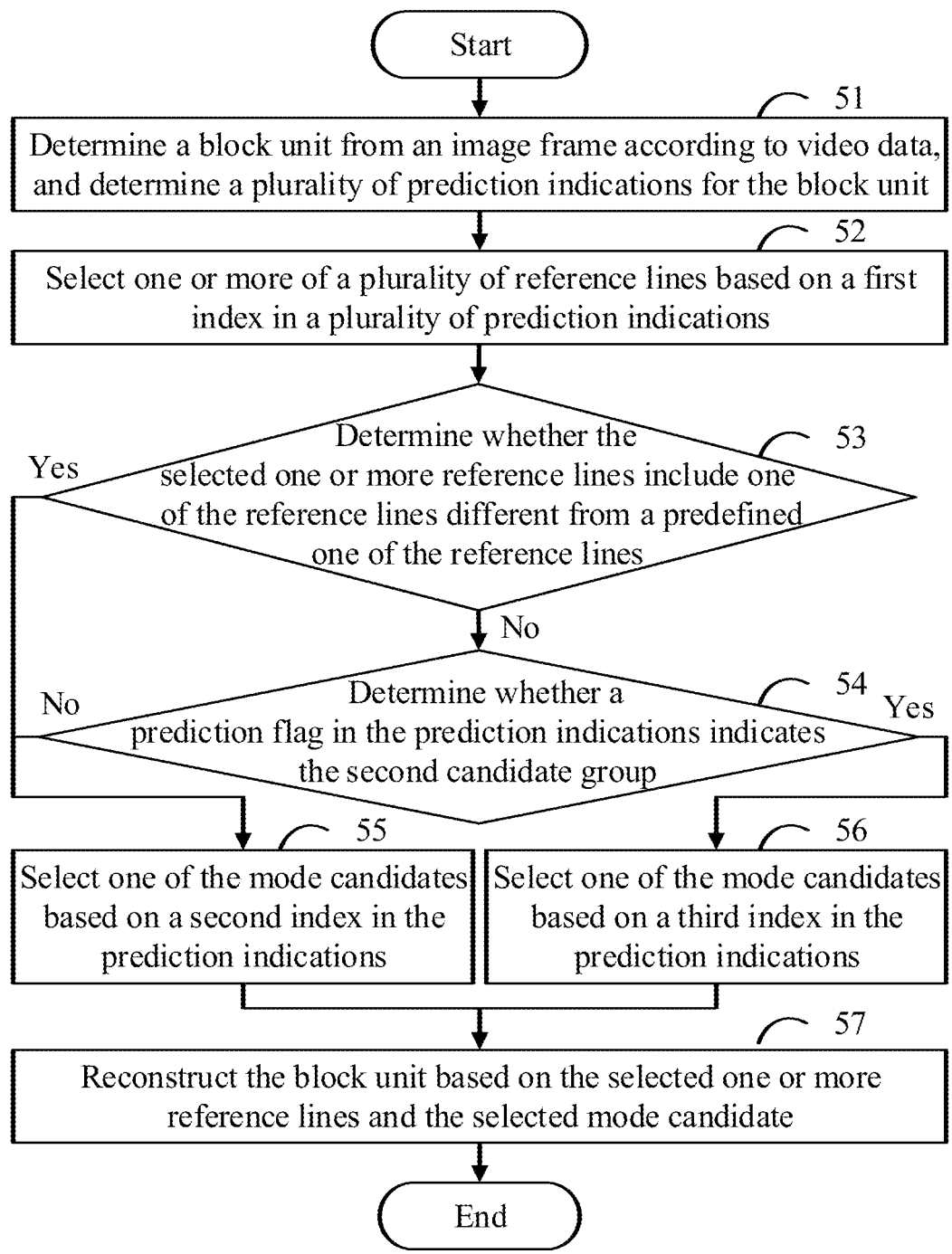
FIG. 5 illustrates a flowchart in accordance with an example implementation of a selection method for selecting a reference line and a prediction mode.

FIG. 5 illustrates a flowchart in accordance with an example implementation the selection method for selecting a reference line and a prediction mode. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 5 represents one or more processes, methods, or subroutines, carried out in the example method. Furthermore, the order of blocks is illustrative only and may change. Additional blocks may be added or less blocks may be utilized without departing from the present disclosure.

At block 51, the decoder module 222 determines a block unit from an image frame according to video data, and determines a plurality of prediction indications for the block unit.

In at least one implementation, the video data may be a bitstream. In at least one implementation, the destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 52, the intra prediction unit 22221 selects one or more of a plurality of reference lines based on a first index in a plurality of prediction indications.

In at least one implementation, the first index may be a line index for the intra prediction unit 22221 to select the one or more reference lines. FIG. 4 is a schematic illustration of an example implementation of a block unit 400 and reference lines having line samples, such as line samples 4111, 4121, 4131, and 4141 in a first reference line 411, a second reference line 412, a third reference line 413, and a fourth reference line 414, respectively. In at least one implementation, the intra prediction unit 22221 may set a first one of the reference lines as the selected reference line based on the line index. In the implementation, the first reference line may be the first reference line 411 adjacent to the block unit 400. In at least one implementation, the intra prediction unit 22221 may set a specific one of the reference lines different from the first reference line as the selected reference line. In addition, the intra prediction unit 22221 may select more than one of the reference lines as the selected reference lines.

At block 53, the intra prediction unit 22221 determines whether the selected one or more reference lines include one of the reference lines different from a predefined one of the reference lines. In at least one implementation, the procedure proceeds to block 54, when the selected one or more reference lines are identical to the predefined reference line. In at least one implementation, the procedure proceeds to block 55, when the selected one or more reference lines include one of the reference lines different from the predefined reference line.

In at least one implementation, the intra prediction unit 22221 may add a plurality of most probable modes (MPMs) into a first candidate group, and add a plurality of non-MPMs into a second candidate group. In at least one implementation, the MPMs are selected from a plurality of mode candidates including a plurality of angular modes, and a plurality of non-angular modes. In at least one implementation, the intra prediction unit 22221 may determine a most probable list based on a plurality of predicted results of neighboring blocks adjacent to the block unit 400. The neighboring blocks may be predicted based on the mode candidates, when the neighboring blocks are predicted by an intra prediction method. Thus, the intra prediction unit 22221 may select some of the mode candidates as the MPMs in the most probable list based on the predicted result of the neighboring blocks.

In at least one implementation, the most probable list including the MPMs may be the first candidate group, and the remaining mode candidates different from the MPMs may be added into the second candidate group.

In at least one implementation, the MPMs may include a plurality of angular MPMs and a plurality of non-angular MPMs. In at least one implementation, the angular MPMs may be added into the first candidate group, and the remaining mode candidates different from the MPMs may be added into the second candidate group.

In at least one implementation, the encoder module 112 of the source device 11 may select more than one of the reference lines to predict the block unit according to one of the mode candidates in the first candidate group. In at least one implementation, the encoder module 112 of the source device 11 may determine the selected reference line different from the predefined reference line to predict the block unit according to one of the mode candidates in the first candidate group. In at least one implementation, the encoder module 112 may select the predefined reference line to predict the block unit according to one of the mode candidates in the second candidate group. In the implementation, the predefined reference line may be the first reference line 411 in FIG. 4.

In at least one implementation, the intra prediction unit 22221 may determine that the block unit is predicted according to one of the mode candidates in the first candidate group, when the selected one or more reference lines include one of the reference lines different from the predefined reference line. Thus, the intra prediction unit 22221 may directly determine, based on the MPM index, which one of the mode candidates is used for predicting the block unit.

In at least one implementation, the intra prediction unit 22221 may determine that the block unit is predicted according to one of the mode candidates selected from one of the first candidate group and the second candidate group, when the selected one or more reference lines are the predefined reference line. Thus, the intra prediction unit 22221 may determine, based on at least one of the MPM flag, the MPM index, and the non-MPM index, which one of the mode candidates is used for predicting the block unit.

At block 54, the intra prediction unit 22221 determines whether a prediction flag in the prediction indications indicates the second candidate group. In at least one implementation, the procedure proceeds to block 55, when one of the candidate groups indicated by the prediction flag is different from the second candidate group. In at least one implementation, the procedure proceeds to block 56, when the prediction flag indicates the second candidate group.

In at least one implementation, the intra prediction unit 22221 may determine that the block unit is predicted according to one of the mode candidates selected from one of the first candidate group and the second candidate group, when the selected one or more reference lines are the predefined reference line. Thus, the intra prediction unit 22221 may first determine whether the block unit is predicted according to one of the MPMs or one of the non-MPMs based on the MPM flag. In at least one implementation, the second candidate group includes all of the non-MPMs. Thus, the intra prediction unit 22221 may determine that the block unit is predicted by one of non-MPMs, when the prediction flag in the prediction indications indicates the second candidate group. In at least implementation, the intra prediction unit 22221 may determine that the block unit is predicted by one of MPMs, when one of the candidate groups indicated by the prediction flag is different from the second candidate group.

At block 55, the intra prediction unit 22221 selects one of the mode candidates based on a second index in the prediction indications.

In at least one implementation, the second index indicates which one of the MPMs is used for predicting the block unit. In the implementation, the second index may be the MPM index.

In at least one implementation, the intra prediction unit 22221 may determine that the block unit is predicted according to one of the mode candidates in the first candidate group, when the selected one or more reference lines include one of the reference lines different from the predefined reference line. Thus, the block unit is predicted according to one of the MPMs by the encoder module 112. In at least one implementation, the intra prediction unit 22221 may directly select one of the MPMs based on the MPM index.

In at least one implementation, the intra prediction unit 22221 may determine that the block unit is predicted according to one of the MPMs, when the selected one or more reference lines are the predefined reference line and one of the candidate groups indicated by the prediction flag is different from the second candidate group. In the implementation, the intra prediction unit 22221 may directly select one of the MPMs based on the MPM index.

At block 56, the intra prediction unit 22221 selects one of the mode candidates based on a third index in the prediction indications.

In at least one implementation, the third index indicates which one of the non-MPMs is used for predicting the block unit. In the implementation, the third index may be the non-MPM index.

In at least one implementation, the intra prediction unit 22221 may determine that the block unit is predicted according to one of the non-MPMs, when the selected one or more reference lines are the predefined reference line and the prediction flag indicates the second candidate group. In at least one implementation, the intra prediction unit 22221 may directly select one of the non-MPMs based on the non-MPM index.

At block unit 57, the intra prediction unit 22221 reconstructs the block unit based on the selected one or more reference lines and the selected mode candidate.

In at least one implementation, the intra prediction unit 22221 may select, based on the selected mode candidate, at least one of the line samples in the selected one or more reference lines for each of the block components. Then, the intra prediction unit 22221 may generate a plurality of the predicted components for the block components. In at least one implementation, the first summer 2224 of the decoder module 222 in the destination device 12 may add the predicted components into a plurality of residual components determined from the bitstream to reconstruct the block unit. In addition, the decoder module 222 may reconstruct all of the other block units in the image frame for reconstructing the image frame and the video.

Figure 6:
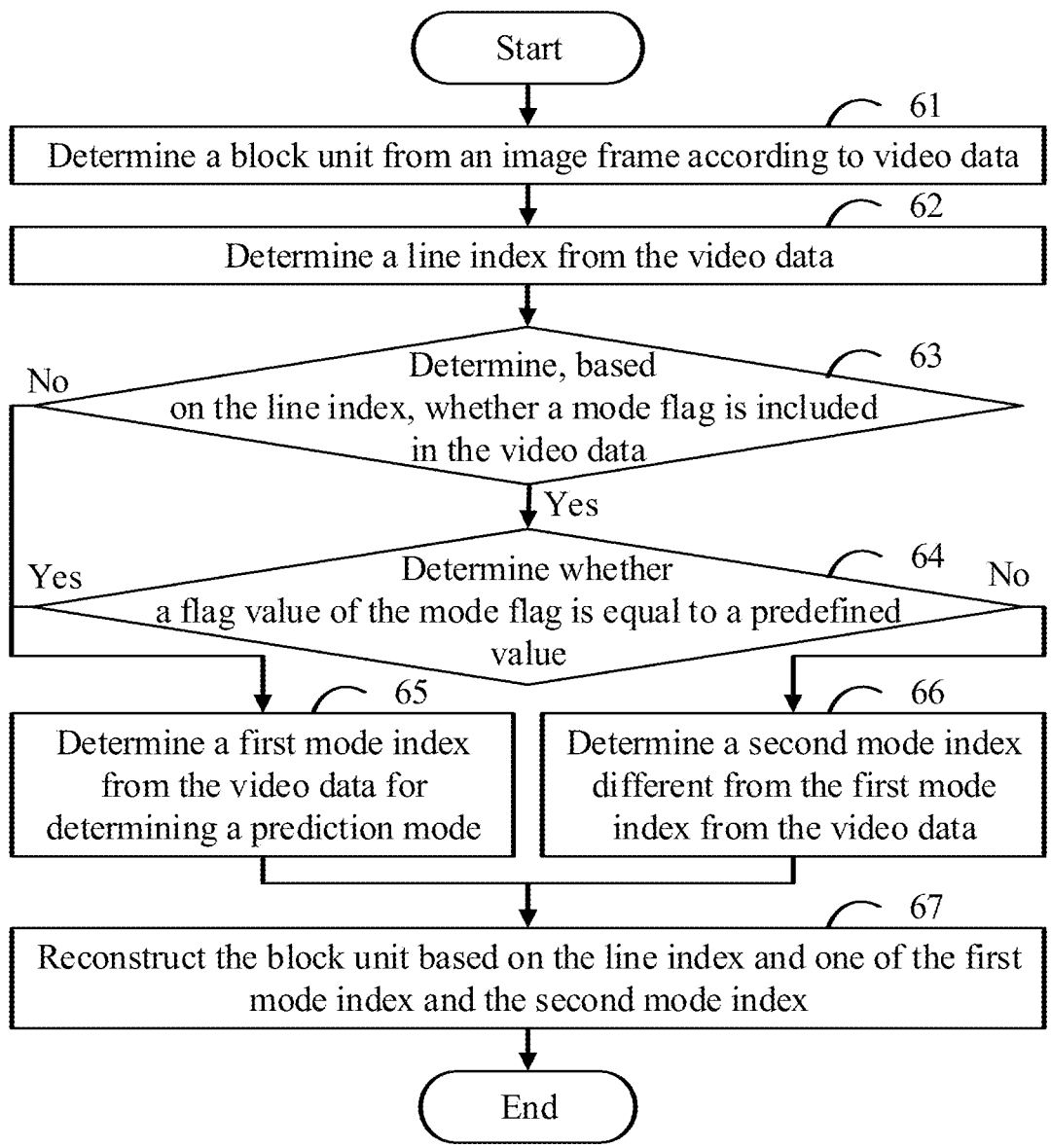
FIG. 6 illustrates a flowchart in accordance with an example implementation of a prediction method according to a line index and a mode flag.

FIG. 6 illustrates a flowchart in accordance with an example implementation of a prediction method according to a line index and a mode flag. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 6 represents one or more processes, methods, or subroutines, carried out in the example method. Furthermore, the order of blocks is illustrative only and may change. Additional blocks may be added or less blocks may be utilized without departing from the present disclosure.

At block 61, the decoder module 222 determines a block unit from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 62, the decoder module 222 determines a line index from the vide data.

In at least one implementation, there are a plurality of neighboring blocks neighboring to the block unit in the image frame. In at least one implementation, each of the neighboring blocks include a plurality of neighboring samples. In at least one implementation, the neighboring samples neighboring to the block unit in the neighboring blocks may be classified into a plurality of reference lines. In the implementation, each of the reference lines includes a plurality of line samples selected from the neighboring samples neighboring to the block unit. FIG. 4 is a schematic illustration of an example implementation of a block unit 400 and reference lines having line samples, such as line samples 4111, 4121, 4131, and 4141 in a first reference line 411, a second reference line 412, a third reference line 413, and a fourth reference line 414, respectively.

In at least one implementation, the encoder module 112 may select one of the reference lines for predicting the block unit, and provide the line index indicating which is the selected reference line to the destination device 12. In the implementation, the decoder module 222 may determine the selected reference line based on the line index, and the decoder module 222 may determine the line samples in the selected reference line as a plurality of reference samples. Thus, the decoder module 222 may reconstruct the block unit based on the reference samples. In at least one implementation, the decoder module 222 may set a first one of the reference lines as the selected reference line based on the line index. In the implementation, the first reference line may be the first reference line 411 adjacent to the block unit 400. In at least one implementation, the decoder module 222 may set a specific one of the reference lines different from the first reference line as the selected reference line. In at least one implementation, the decoder module 222 may select more than one of the reference lines as the selected reference lines.

In at least one implementation, the decoder module 222 may select the first reference line 411 and determine the line samples in the first reference line 411 as the reference samples, when the line index is equal to a first predefined value. In at least one implementation, the decoder module 222 may select one of the other reference lines 412-414, when the line index is different from the first predefined value. In at least one implementation, the line index may be a syntax element intra_luma_ref_idx in versatile video coding (VVC) or VVC test model (VTM). In at least one implementation, the first predefined value may be equal to zero.

At block 63, the decoder module 222 determines, based on the line index, whether a mode flag is included in the video data. In at least one implementation, the procedure proceeds to block 64, when the decoder module 222 determines that the mode flag is included in the video data. In at least one implementation, the procedure proceeds to block 65, when the decoder module 222 determines that the mode flag is not presented in the video data.

In at least one implementation, the decoder module 222 may determine a prediction mode from a plurality of mode candidates to predict the block unit. In at least one implementation, the mode candidates may include a plurality of non-angular modes and a plurality of angular modes. In the implementation, the non-angular modes may include a Planar mode and a DC mode. In one implementation, the number of the angular modes may be equal to 65, when the decoder module 222 decodes the block unit in VVC or VTM. In another implementation, the number of the angular modes may be equal to 33, when the decoder module 222 decodes the block unit in high efficiency video coding (HEVC). In at least one implementation, the decoder module 222 may determine a plurality of most probable modes (MPMs) from the mode candidates based on the neighboring blocks neighboring to the block unit. In at least one implementation, a specific one of the mode candidates may be set as one of the most probable modes for the block unit, when the decoder module 222 reconstructs a specific one of the neighboring blocks according to the specific mode candidate. In addition, the decoder module 222 may derive the other of the most probable modes based on the specific mode candidate. In the implementation, the unselected mode candidates may be regarded as a plurality of remaining mode candidates, when the decoder module 222 selects the most probable modes from the mode candidates.

In at least one implementation, the encoder module 112 may select the prediction mode from the most probable modes and the remaining mode candidates, when the encoder module 112 selects the first one of the reference lines to predict the block unit. In the implementation, the intra prediction unit 22221 needs the mode flag received from the encoder module 112 to determine whether the prediction mode is selected from the MPMs, when the first one of the reference lines is selected to predict the block unit. Thus, the decoder module 222 may determine, based on the line index of the block unit, that the mode flag is included in the video data, since the line index of the block unit equal to the first predefined value indicates that the first one of the reference lines is selected to predict the block unit.

In at least one implementation, the encoder module 112 may select the intra prediction mode only from the most probable modes, when the encoder module 112 selects a specific one of the reference lines different from the first reference line to predict the block unit. In the implementation, it is unnecessary for the intra prediction unit 22221 to receive the mode flag indicating whether the prediction mode is selected from the MPMs, when the selected reference line is different from the first one of the reference lines. Thus, the decoder module 222 may determine, based on the line index of the block unit, that the mode flag is not presented in the video data, since the line index of the block unit different from the first predefined value indicates that the selected reference line is different from the first one of the reference lines.

At block 64, the decoder module 222 determines whether a flag value of the mode flag is equal to a predefined value. In at least one implementation, the procedure proceeds to block 65, when the flag value is equal to the predefined value. In at least one implementation, the procedure proceeds to block 66, when the flag value is different from the predefined value.

In at least one implementation, the encoder module 112 may set the mode flag be equal to a second predefined value, when the encoder module 112 selects the prediction mode from the MPMs to predict the block unit. In at least one implementation, the encoder module 112 may set the mode flag be different from the second predefined value, when the encoder module 112 selects the intra prediction mode from the remaining mode candidates to predict the block unit. In at least one implementation, the mode flag may be a syntax element pre_intra_luma_pred_flag in HEVC. In at least one implementation, the mpm flag may be a syntax element intra_luma_mpm_flag in VVC or VTM. In at least one implementation, the second predefined value may be equal to one.

In at least one implementation, the prediction mode may be selected from the most probable modes and the remaining mode candidates, when the decoder module 222 determines that the first reference line is selected to reconstruct the block unit before parsing the mode flag. Thus, the decoder module 222 may determine whether the mode flag is equal to the second predefined value for determining the prediction mode. In one implementation, the decoder module 222 may determine that the prediction mode is selected from the remaining mode candidates, when the decoder module 222 determines that the mode flag is different from the second predefined value. In another implementation, the decoder module 222 may determine that the intra prediction mode is selected from the MPMs, when the decoder module 222 determines that the mode flag is equal to the second predefined value.

At block 65, the decoder module 222 determines a first mode index from the video data for determining the prediction mode.

In at least one implementation, the decoder module 222 may determine the prediction mode of the block unit is selected from the MPMs, when the line index is different from the first predefined value or the mode flag is equal to the second predefined value. In the implementation, the intra prediction unit 22221 may determine that the prediction mode may be selected based on the first mode index from the MPMs. In at least one implementation, the first mode index may be an mpm index for selecting the prediction mode from the MPMs. In at least one implementation, the mpm index may be a syntax element mpm_idx in HEVC. In at least one implementation, the mpm index may be a syntax element intra_luma_mpm_idx in VVC or VTM.

At block 66, the decoder module 222 determines a second mode index different from the first mode index from the video data for determining the prediction mode.

In at least one implementation, the decoder module 222 may determine the prediction mode of the block unit is selected from the remaining mode candidates, when the mode flag is different from the second predefined value. In the implementation, the decoder module 222 may determine that the prediction mode may be selected based on the second mode index from the remaining mode candidates. In at least one implementation, the second mode index may be a non-mpm index for selecting the prediction mode from the remaining mode candidates. In at least one implementation, the non-mpm index may be a syntax element rem_intra_luma_pred_mode in HEVC. In at least one implementation, the non-mpm index may be a syntax element intra_luma_mpm_remainder in VVC or VTM.

At block 67, the decoder module 222 reconstructs the block unit based on the line index and one of the first mode index and the second mode index.

In at least one implementation, the intra prediction unit 22221 may determine the selected reference line based on the line index, and the intra prediction unit 22221 may determine the line samples in the selected reference line as the reference samples. Thus, the decoder module 222 may reconstruct the block unit based on the reference samples.

In at least implementation, the non-angular modes may be predefined to add into the MPMs, when the encoder module 112 predicts the block unit. Thus, the encoder module 112 may add the Planar mode and the DC mode into the MPMs. In at least one implementation, the intra prediction unit 22221 also adds the non-angular modes into the MPMs to generate a most probable list. In other words, the most probable list may include the non-angular mods and more than one of the angular modes selected based on the predicted results of the neighboring blocks.

In at least one implementation, the encoder module 112 may adjust the most probable list, when the encoder module 112 determines the selected reference line different from the first reference line for predicting the block unit. In one implementation, the non-angular modes in the most probable list may be excluded to generate a sub list, when the encoder module 112 determine that the selected reference line is different from the first reference line. In the implementation, the intra prediction unit 22221 may exclude the non-angular modes in the most probable list to generate the sub list, when the intra prediction unit 22221 determines that the selected reference line determined based on the line index for reconstructing the block unit is different from the first reference line. In other words, the prediction mode may be selected only from the MPMs included in the sub list based on the first mode index, when the intra prediction unit 22221 determines the selected reference line for reconstructing the block unit is different from the first reference line.

In at least one implementation, the encoder module 112 may remain the most probable list, when the encoder module 112 determines the selected reference line for predicting the block unit is different from the first reference line. Thus, the encoder module 112 may determine that the non-angular modes in the most probable list may be used to predict the block unit, when the encoder module 112 determines that the selected reference line is different from the first reference line. In the implementation, the intra prediction unit 22221 also remain the most probable list, when the intra prediction unit 22221 determines that the selected reference line determined based on the line index for reconstructing the block unit is different from the first reference line. In other words, the non-angular modes may be selected to reconstruct the block unit, when the intra prediction unit 22221 determines the selected reference line different from the first reference line to reconstruct the block unit.

In at least one implementation, the prediction mode may be selected from one of the MPMs and the remaining mode candidates, when the selected reference line is the first reference line. In at least one implementation, the prediction mode may be selected from one of the MPMs, when the selected reference line is different from the first reference line. Thus, the selected reference line is the first reference line, when the prediction mode is selected based on the second mode index from the remaining mode candidates. In at least one implementation, the non-angular modes are excluded from the remaining mode candidates, since the non-angular modes are predefined to add into the MPMs. Thus, the selected mode candidate is different from the non-angular modes, when the intra prediction unit 22221 determines the prediction mode of the block unit based on the second mode index. In the implementation, the prediction mode is one of the angular modes, when the intra prediction unit 22221 determines the prediction mode of the block unit based on the second mode index.

In at least one implementation, the block unit may include a plurality of block components. In the implementation, each of the block components may be a pixel element. The intra prediction unit 22221 may select, based on the prediction mode, at least one of the line samples in the selected reference line for each of the block components. Then, the intra prediction unit 22221 may generate a plurality of predicted components for the block components.

In at least one implementation, the first summer 2224 of the decoder module 222 in the destination device 12 may add the predicted components into a plurality of residual components determined from the bitstream to reconstruct the block unit. In addition, the decoder module 222 may reconstruct all of the other block units in the image frame for reconstructing the image frame and the video.

Figure 7:
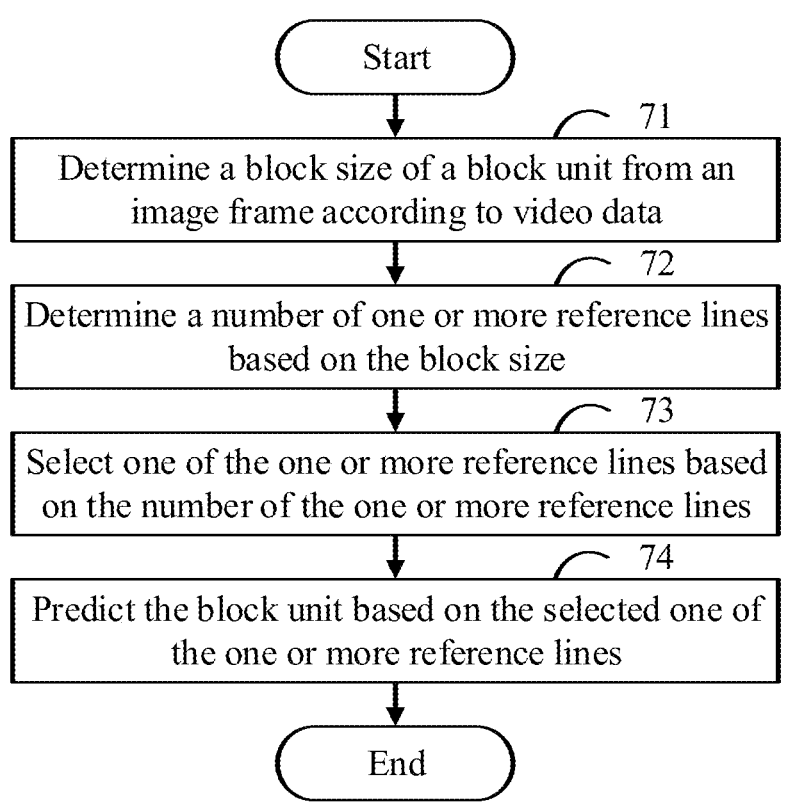
FIG. 7 illustrates a flowchart in accordance with an example implementation of a line quantity determination method.

FIG. 7 illustrates a flowchart in accordance with an example implementation of a line quantity determination method. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 7 represents one or more processes, methods, or subroutines, carried out in the example method. Furthermore, the order of blocks is illustrative only and may change. Additional blocks may be added or less blocks may be utilized without departing from the present disclosure.

At block 71, the decoder module 222 determines a block unit having a block size from an image frame according to video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having the block size according to the partition indications based on any video coding standard. In at least one implementation, the block size may include a block height and a block width.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 72, the intra prediction unit 22221 determines a number of one or more reference lines based on the block size.

In at least one implementation, the prediction process unit 2222 of the destination device 12 determines the block unit from the video data via the entropy decoding unit 2221, and determines the one or more reference lines of the block unit. In at least one implementation, each of the one or more reference lines has a plurality of line samples. With reference to FIG. 4, the decoder module 222 may determine the block unit 400 and the one or more reference lines each having the line samples, such as the line samples 4111-4141 in a first reference line 411, a second reference line 412, a third reference line 413, and a fourth reference line 414, when the number of the one or more reference lines is equal to four. In at least one implementation, the block unit 400 includes a plurality of block components, such a first block component 401. The intra prediction unit 22221 may generate a predicted component for each of the block components based on the one or more reference lines according to a prediction mode.

In at least one implementation, the intra prediction unit 22221 may first determine the number of one or more reference lines, and then determine the prediction mode based on the number of one or more reference lines. For example, the intra prediction unit 22221 may determine that the prediction mode may be selected from a plurality of most probable modes (MPMs), when the number of one or more reference lines is greater than one. In addition, the intra prediction unit 22221 may determine that the prediction mode may be selected from a plurality of mode candidates, when the number of one or more reference lines is equal to one. In at least one implementation, the mode candidates may be a plurality of intra prediction modes. In at least one implementation, the MPMs may be selected from the mode candidates into a MPM list based on a plurality of neighboring modes of a plurality of neighboring blocks neighboring to the block unit, when the neighboring modes are selected from the mode candidates. In at least one implementation, the other unselected mode candidates may be set as a plurality of non-MPMs in a non-MPM list.

In at least one implementation, the intra prediction unit 22221 may determine a size comparison based on the block size. In at least one implementation, the intra prediction unit 22221 may determine the size comparison based on the block size and a size threshold. In at least one implementation, the intra prediction unit 22221 may determine that the number of the one or more reference lines is equal to a predefined quantity greater than one, when the size comparison satisfies a predefined condition. In at least one implementation, the intra prediction unit 22221 may determine that the number of the one or more reference lines is equal to one, when the size comparison does not satisfy the predefined condition. In at least one implementation, the predefined condition may include at least one of a plurality of comparison conditions. In at least one implementation, the intra prediction unit 22221 may determine whether the size comparison satisfies two of the comparison conditions, when the predefined condition includes the two of the comparison conditions.

In at least one implementation, the intra prediction unit 22221 may determine that the number of the one or more reference lines is equal to a first predefined quantity, when a size product W×H of the block width W and the block height H is less than a first size threshold in a first comparison condition. In at least one implementation, the intra prediction unit 22221 may determine that the number of the one or more reference lines is equal to a second predefined quantity, when the size product W×H is greater than a second size threshold in a second comparison condition. In at least one implementation, the first size threshold is different from the second size threshold. In one implementation, the first size threshold is greater than the second size threshold. In at least one implementation, the intra prediction unit 22221 may determine that the number of the one or more reference lines is equal to a third predefined quantity, when a size quotient W/H or H/W of the block width W and the block height H is less than a third size threshold in a third comparison condition. In one implementation, the intra prediction unit 22221 may compare the size quotient W/H with the third size threshold, when the block height H is longer than the block width W. In another implementation, the intra prediction unit 22221 may compare the size quotient H/W with the third size threshold, when the block height H is longer than the block width W. In at least one implementation, the intra prediction unit 22221 may determine that the number of the one or more reference lines is equal to a fourth predefined quantity, when the block width W is equal to the block height H in a fourth comparison condition. In other words, the intra prediction unit 22221 may determine that the number of the one or more reference lines is equal to the fourth predefined quantity, when the size quotient W/H is equal to a fourth size threshold equal to one and different from the third size threshold in the fourth comparison condition. In at least one implementation, each of the first predefined quantity, the second predefined quantity, the third predefined quantity, and the four predefined quantity may be a pre-assigned positive integer. For example, each of the first predefined quantity, the third predefined quantity, and the four predefined quantity may be equal to four, and the second predefined quantity may be equal to two. In at least one implementation, each of the first size threshold, the second size threshold, and the third size threshold may be a pre-assigned positive integer. For example, the first size threshold may be equal to 4096, the second size threshold may be equal to 128, and the third size threshold may be equal to two. In at least one implementation, the intra prediction unit 22221 may use at least one of the first size threshold, the second size threshold, the third size threshold, a comparison result between the block width W and the block height H, and any other size comparison conditions to determine the number of the one or more reference lines based on at least one of the first predefined quantity, the second predefined quantity, the third predefined quantity, the four predefined quantity, and any other predefined quantities.

In at least one implementation, more than one of the predefined quantities may be selected to determine the number of the one or more reference lines simultaneously, when the intra prediction unit 22221 determines the number of the one or more reference lines based on the predefined condition including more than one of the comparison conditions corresponding to the selected quantities. In the implementation, the predefined condition may include more than one of the first comparison condition, the second comparison condition, the third comparison condition, the fourth comparison condition, and any other size comparison conditions.

In at least one implementation, the selected quantities may be equal to each other. In at least one implementation, the intra prediction unit 22221 may determine that the number of the one or more reference lines is equal to the selected quantities, when the size comparison satisfies each of the comparison conditions in the predefined condition. In addition, the intra prediction unit 22221 may determine that the number of the one or more reference lines is equal to one, when the size comparison does not satisfy one of the comparison conditions in the predefined condition. For example, the intra prediction unit 22221 may determine that the number of the one or more reference lines is equal to the first predefined quantity based on the comparison result that the size product W×H is less than the first size threshold and the size quotient W/H is less than the third size threshold, when the first predefined quantity is equal to the third predefined quantity. In at least one implementation, the intra prediction unit 22221 may determine that the number of the one or more reference lines is equal to the selected quantities, when the size comparison satisfies one of the comparison conditions in the predefined condition. In addition, the intra prediction unit 22221 may determine that the number of the one or more reference lines is equal to one, when the size comparison does not satisfy each of the comparison conditions in the predefined condition. For example, the intra prediction unit 22221 may determine that the number of the one or more reference lines is equal to the first predefined quantity based on the comparison result that the size product W×H is greater than the first size threshold and the size quotient W/H is less than the third size threshold, when the first predefined quantity is equal to the third predefined quantity.

In at least one implementation, the selected quantities may be different from each other. In at least implementation, the intra prediction unit 22221 may determine which of the comparison conditions in the predefined condition the size comparison satisfies. In at least one implementation, the intra prediction unit 22221 may determine that the number of the one or more reference lines is equal to one of the selected quantities, when the size comparison satisfies only one of the comparison conditions in the predefined condition corresponding to the determined quantity. In at least one implementation, the intra prediction unit 22221 may determine that the number of the one or more reference lines based on more than one of the selected quantities, when the size comparison satisfies more than one of the comparison conditions corresponding to the determined quantities. In at least one implementation, the intra prediction unit 22221 may determine the number of the one or more reference lines is equal to the minimum of the determined quantities. In at least one implementation, the intra prediction unit 22221 may determine the number of the one or more reference lines is equal to the maximum of the determined quantities. In addition, the intra prediction unit 22221 may determine that the number of the one or more reference lines is equal to one, when the size comparison does not satisfy each of the comparison conditions in the predefined condition. For example, the intra prediction unit 22221 may determine that the number of the one or more reference lines is equal to the second predefined quantity based on the comparison result that the size product W×H is greater than the second size threshold and the size quotient W/H is less than the third size threshold, when the second predefined quantity is less than the third predefined quantity.

At block 73, the intra prediction unit 22221 selects one of the one or more reference lines based on the number of the one or more reference lines.

In at least one implementation, the intra prediction unit 22221 may decode a line index in the bitstream to select one of the one or more reference lines as a prediction line, when the number of the one or more reference lines is greater than one. In at least one implementation, the intra prediction unit 22221 may directly determine the one or more reference lines as the prediction line, when the number of the one or more reference lines is equal to one. In the implementation, there may be no line index for the block unit in the bitstream. In at least one implementation, the one or more reference lines may be predefined as the first reference line 411, when the number of the one or more reference lines is equal to one.

In at least one implementation, the intra prediction unit 22221 may decode the line index in the bitstream to select one of the one or more reference lines, when the intra prediction unit 22221 determines that the size product W×H is less than the first size threshold. In at least one implementation, there may be no line index for the block unit in the bitstream, when the size product W×H is greater than or equal to the first size threshold.

In at least one implementation, the intra prediction unit 22221 may decode the line index in the bitstream to select one of the one or more reference lines, when the intra prediction unit 22221 determines that the size product W×H is greater than the second size threshold. In at least one implementation, there may be no line index for the block unit in the bitstream, when the size product W×H is less than or equal to the second size threshold.

In at least one implementation, the intra prediction unit 22221 may decode the line index in the bitstream to select one of the one or more reference lines, when the intra prediction unit 22221 determines that the size quotient W/H or H/W is less than the third size threshold. In at least one implementation, there may be no line index for the block unit in the bitstream, when the size quotient W/H or H/W is greater than or equal to the third size threshold.

In at least one implementation, the intra prediction unit 22221 may decode the line index in the bitstream to select one of the one or more reference lines, when the intra prediction unit 22221 determines that the block height H is equal to the block width W. In at least one implementation, there may be no line index for the block unit in the bitstream, when the block height H is different from the block width W.

In at least one implementation, the intra prediction unit 22221 may decode the line index in the bitstream to select one of the one or more reference lines, when the intra prediction unit 22221 determines that the size comparison satisfies at least one of the comparison conditions in the predefined condition. In at least one implementation, there may be no line index for the block unit in the bitstream, when the size comparison does not satisfy each of the comparison conditions in the predefined condition.

In at least one implementation, the intra prediction unit 22221 may decode the line index in the bitstream to select one of the one or more reference lines, when the intra prediction unit 22221 determines that the size comparison satisfies each of the comparison conditions in the predefined condition. In at least one implementation, there may be no line index for the block unit in the bitstream, when the size comparison does not satisfy one of the comparison conditions in the predefined condition.

At block 74, the intra prediction unit 22221 predicts the block unit of the image frame based on the selected one of the one or more reference lines.

In at least one implementation, the prediction mode may be selected from the mode candidates based on a mode flag and a mode index. In at least one implementation, the mode flag indicates whether the prediction mode is selected from the MPM list. In at least one implementation, the mode index is an MPM index indicating one of the MPMs, when the prediction mode is selected from the MPM list. In at least one implementation, the mode index is an non-MPM index indicating one of the non-MPMs, when the prediction mode is include in the non-MPM list. In at least one implementation, the intra prediction unit 22221 determines the prediction mode based on the mode flag and the mode index, when the selected one of the one or more reference lines is identical to the first one of the one or more reference lines. In at least one implementation, the intra prediction unit 22221 determines the prediction mode based on the MPM index without parsing the mode flag, when the selected one of the one or more reference lines includes one of the one or more reference lines different from the first one of the one or more reference lines. In at least one implementation, the first one of the one or more reference lines is adjacent to the block unit.

In at least one implementation, the intra prediction unit 22221 may select, based on the prediction mode, at least one of the line samples in the selected one of the one or more reference lines for each of the block components. Then, the intra prediction unit 22221 may generate the predicted components for the block components. In at least one implementation, the first summer 2224 of the decoder module 222 in the destination device 12 may add the predicted components into a plurality of residual components determined from the bitstream to reconstruct the block unit. In addition, the decoder module 222 may reconstruct all of the other block units in the image frame for reconstructing the image frame and the video.

Figure 8:
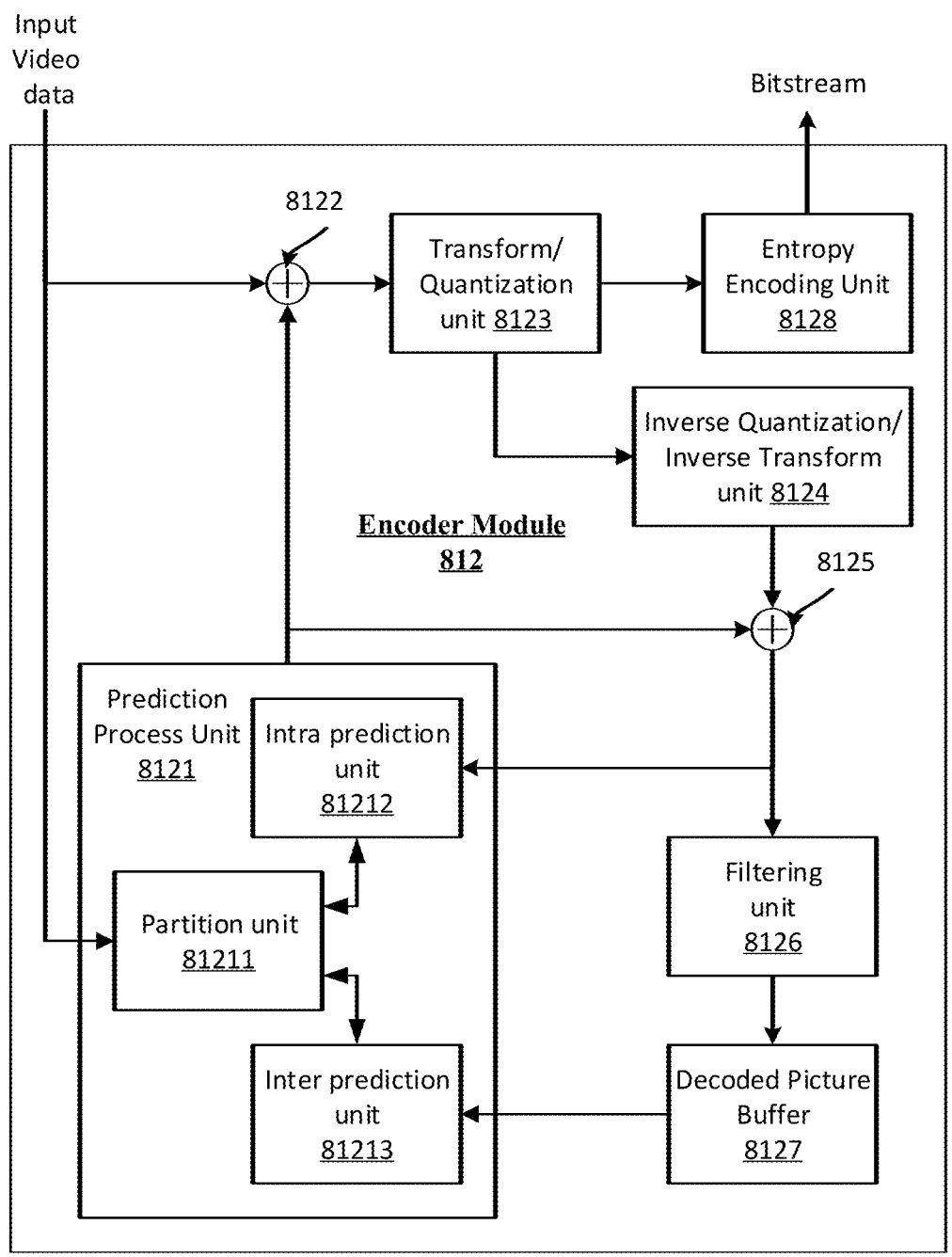
FIG. 8 is a block diagram of an example implementation of an encoder module of a source device in the system of FIG. 1.

FIG. 8 is a block diagram of an encoder module 812 representing an example implementation of the encoder module 812 of the source device 11 in the system of FIG. 1. In at least one implementation, the encoder module 812 includes a prediction processor (e.g., a prediction process unit 8121), at least one summer (e.g., a first summer 8122 and a second summer 8125), a quantization/transform processor (e.g., a transform/quantization unit 8123), an inverse quantization/inverse transform processor (e.g., an inverse quantization/inverse transform unit 8124), a filter (e.g., a filtering unit 8126), a decoded picture buffer (e.g., a decoded picture buffer 8127), and an entropy encoder (e.g., an entropy encoding unit 8128). In at least one implementation, the prediction process unit 8121 of the encoder module 812 further includes a partition processor (e.g., a partition unit 81211), an intra prediction processor (e.g., an intra prediction unit 81212), and an inter prediction processor (e.g., an inter prediction unit 81213). In at least one implementation, the encoder module 812 receives the source video, and encodes the source video to output a bitstream.

In at least one implementation, the encoder module 812 may receive a source video including a plurality of image frames, and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit. In at least one implementation, the encoder module 812 may perform additional sub-divisions of the source video. It should be noted that the present disclosure described herein are generally applicable to video coding, regardless of how the source video is partitioned prior to and/or during encoding.

In at least one implementation, during the encoding process, the prediction process unit 8121 receives a current image block of a specific one of the image frames. The current image block may be one of the luminance block and the at least one of the chrominance block in the specific image frame. The partition unit 81211 divides the current image block into multiple block units. The intra prediction unit 81212 may perform intra-predictive coding of a current block unit relative to one or more neighboring blocks in the same frame as the current block unit to provide spatial prediction. The inter prediction unit 81213 may perform inter-predictive coding of the current block unit relative to one or more blocks in one or more reference image blocks to provide temporal prediction.

In at least one implementation, the prediction process unit 8121 may select one of the coding results generated by the intra prediction unit 81212 and the inter prediction unit 81213 based on a mode selection method, such as a cost function. In at least one implementation, the mode selection method may be a rate-distortion optimization (RDO) process. The prediction process unit 8121 determines the selected coding result, and provides a predicted block corresponding to the selected coding result to the first summer 8122 for generating a residual block and to the second summer 8125 for reconstructing the encoded block unit. In at least one implementation, the prediction process unit 8121 may further provide syntax elements, such as motion vectors, intra-mode indicators, partition information, and other syntax information, to the entropy encoding unit 8128.

In at least one implementation, the intra prediction unit 81212 may intra-predict the current block unit. In at least one implementation, the intra prediction unit 81212 may determine an intra-prediction mode directing toward reconstructed sample neighboring to the current block unit to encode the current block unit. In at least one implementation, the intra prediction unit 81212 may encode the current block unit using various intra-prediction modes, and the intra prediction unit 81212 or the prediction process unit 8121 may select an appropriate intra-prediction mode from the tested modes. In at least one implementation, the intra prediction unit 81212 may encode the current block unit using a cross component prediction mode to predict one of the two chroma components of the current block unit based on the luma components of the current block unit. In addition, the intra prediction unit 81212 may predict a first one of the two chroma components of the current block unit based on the other of the two chroma components of the current block unit.

In at least one implementation, the inter prediction unit 81213 may inter-predict the current block unit as an alternative to the intra-prediction performed by the intra prediction unit 81212, as described above. The inter prediction unit 81213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 81213 receives at least one reference image block stored in the decoded picture buffer 8127 and estimates the motion based on the received reference image blocks to generate the motion vector.

In at least one implementation, the first summer 8122 generates the residual block by subtracting the prediction block determined by the prediction process unit 8121 from the original current block unit. The first summer 8122 represents the component or components that perform this subtraction operation.

In at least one implementation, the transform/quantization unit 8123 applies a transform to the residual block to generate a residual transform coefficient, and then quantizes the residual transform coefficients to further reduce bit rate. In at least one implementation, the transform may be DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 8123 may perform a scan of the matrix including the quantized transform coefficients. Alternatively, the entropy encoding unit 8128 may perform the scan.

In at least one implementation, the entropy encoding unit 8128 may receive a plurality of syntax elements including quantization parameter, transform data, motion vectors, intra modes, partition information, and other syntax information, from the prediction process unit 8121, and the transform/quantization unit 8123, and entropy encodes the syntax elements into the bitstream. In at least one implementation, the entropy encoding unit 8128 entropy encodes the quantized transform coefficients. In at least one implementation, the entropy encoding unit 8128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 8124 may apply inverse quantization and inverse transformation to reconstruct the residual block in the pixel domain for later use as a reference block. In at least one implementation, the second summer 8125 adds the reconstructed residual block to the prediction block provided from the prediction process unit 8121 to produce a reconstructed block for storage in the decoded picture buffer 8127.

In at least one implementation, the filtering unit 8126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 8125.

In at least one implementation, the decoded picture buffer 8127 may be a reference picture memory that stores the reference block for use in encoding video by the encoder module 812, e.g., in intra- or inter-coding modes. The decoded picture buffer 8127 may be formed by any of a variety of memory devices, such as DRAM, including SDRAM, MRAM, RRAM), or other types of memory devices. In at least one implementation, the decoded picture buffer 8127 may be on-chip with other components of the encoder module 812, or off-chip relative to those components.

Figure 9:
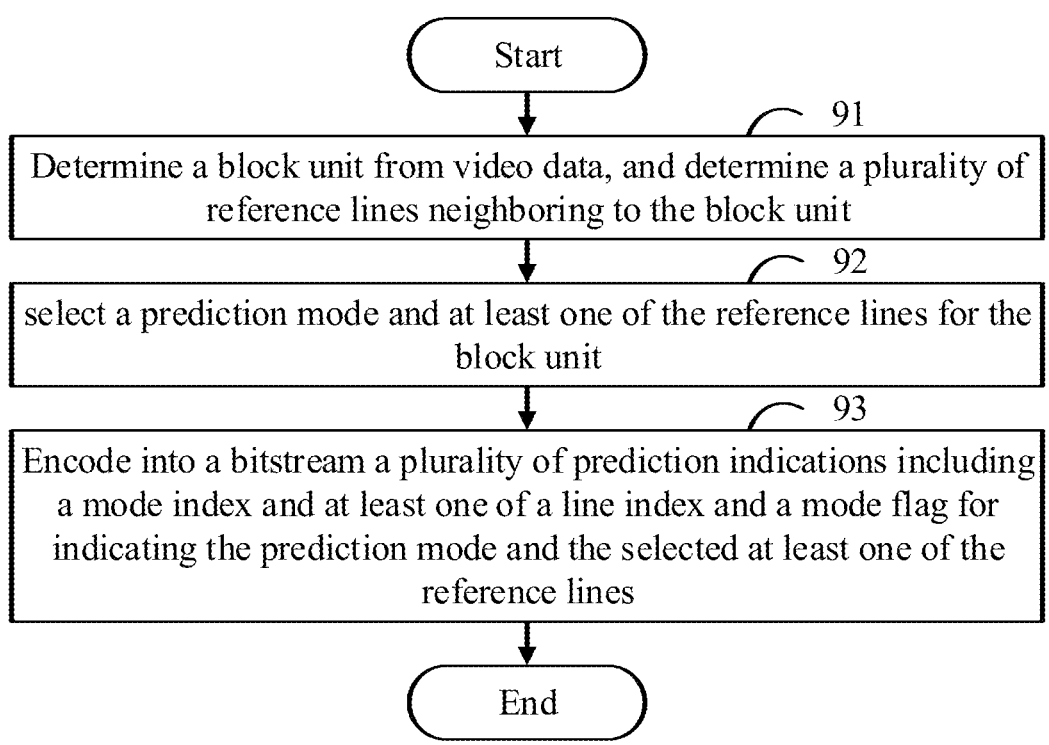
FIG. 9 illustrates a flowchart in accordance with an example implementation of a selection method for selecting a reference line and a prediction mode.

FIG. 9 illustrates a flowchart in accordance with an example implementation of a selection method for selecting a reference line and a prediction mode. The example method is provided by way of example only, as there are a variety of ways to carry out the method. The method described below may be carried out using the configurations illustrated in FIG. 1 and FIG. 8, for example, and various elements of these figures are referenced in explaining the example method. Each block shown in FIG. 9 represents one or more processes, methods, or subroutines, carried out in the example method. Furthermore, the order of blocks is illustrative only and may change. Additional blocks may be added or less blocks may be utilized without departing from the present disclosure.

At block 91, the encoder module 812 determines a block unit from video data, and determines a plurality of reference lines neighboring to the block unit.

In at least one implementation, the video data may be a video. The source device 11 may receive the video by the source module 111. The encoder module 812 determines the image frame from the video, and divides the image frame to determine the block unit.

In at least one implementation, the prediction process unit 8121 of the source device 11 determines the block unit from the video via the partition unit 81211, and then the encoder module 812 provides a plurality of partition indications into a bitstream based on a partition result of the partition unit 81211.

In at least one implementation, the prediction process unit 8121 of the source device 11 determines the neighboring blocks neighboring with the block unit. In at least one implementation, the neighboring blocks may be predicted prior to predicting the block unit, so the neighboring blocks may include a plurality of neighboring samples which may be used to predicted the block unit. In at least one implementation, the neighboring samples neighboring to the block unit may be classified into the reference lines based on a plurality of sample locations of the neighboring samples. FIG. 4 is a schematic illustration of an example implementation of a block unit 400 and reference lines having line samples, such as line samples 4111, 4121, 4131, and 4141 in a first reference line 411, a second reference line 412, a third reference line 413, and a fourth reference line 414, respectively. In at least one implementation, the block unit may be predicted prior to predicting some of the neighboring blocks, so the unpredicted neighboring blocks may not include the neighboring samples for the block unit.

At block 92, the prediction process unit 8121 selects a prediction mode and at least one of the reference lines for the block unit.

In at least one implementation, the intra prediction unit 81212 may predict the block unit based on the reference lines according to a plurality of mode candidates. In at least one implementation, the inter prediction unit 81213 may predict the block unit based on at least one reference frame in the video data according to at least one motion vector. In at least one implementation, the prediction process unit 8121 may select the prediction mode from a plurality of prediction result generated by the intra prediction unit 81212 and the inter prediction unit 81213. In at least one implementation, the prediction process unit 8121 may also determine the selected at least one of the reference lines for predicting the block unit, when the prediction mode is selected from the mode candidates.

At block 93, the encoder module 812 encodes into a bitstream a plurality of prediction indications including a mode index and at least one of a line index and a mode flag for indicating the prediction mode and the selected at least one of the reference lines.

In at least one implementation, the line index may be equal to one of a plurality of first index values. In at least one implementation, each of the first index values corresponds to a reference set. In the implementation, the number of the reference lines in each of the reference sets may be equal to or greater than one. In at least one implementation, a specific one of the first index values corresponding to the selected at least one of the reference lines may be selected for encoding into the bitstream, when the selected at least one of the reference lines is determined by the prediction process unit 8121.

In at least one implementation, the mode flag may indicate whether the prediction mode is included in a plurality of most probable modes (MPMs) selected from the mode candidates based on a plurality of neighboring modes of the neighboring blocks. In at least one implementation, a specific one of the neighboring modes may be added into the MPMs of the block unit, when the specific neighboring mode is selected from the mode candidates. In at least one implementation, the mode candidates include a plurality of angular modes and a plurality of non-angular modes. In at least one implementation the non-angular modes may be predefined to add into the MPMs. In at least one implementation, the mode candidates which are not selected into the MPMs may be set as a plurality of remaining mode candidates. In at least one implementation, the encoder module 812 may determine a flag value of the mode flag based on a relationship between the prediction mode and the MPMs. In at least one implementation, the flag value may be equal to one, when the prediction mode is included in the MPMs. In at least one implementation, the flag value may be equal to zero, when the prediction mode is not included in the MPMs.

In at least one implementation, the mode index may be one of an MPM index and a non-MPM index. In at least one implementation, the mode index may be the MPM index indicating which one of the MPMs is the prediction mode, when the prediction mode is included in the MPMs. In at least one implementation, the mode index may be the non-MPM index indicating which one of the remaining mode candidates is the prediction mode, when the prediction mode is not included in the MPMs.

In at least one implementation, the encoder module 812 may first encode the line index into the bitstream. In at least one implementation, the prediction mode may be selected from the MPMs and the remaining mode candidates, when the selected at least one of the reference lines is a predefined one of the reference lines. Thus, the mode flag may be included in the bitstream, when the line index indicates that the selected at least one of the reference lines is the predefined reference line. In at least one implementation, the bitstream may include the mode flag and the mode index indicating the prediction mode and the line index indicating the predefined reference line, when the encoder module 812 may first encode into the bitstream the line index indicating that the selected at least one of the reference lines is the predefined reference line. In at least one implementation, the predefined reference line may be the first reference line 411. In at least one implementation, the prediction mode is only selected from the MPMs, when the selected at least one of the reference lines includes one of the reference lines different from the predefined reference line. Thus, there may be no mode flag in the bitstream, when the line index indicates that the selected at least one of the reference lines includes one of the reference lines different from the predefined reference line. In at least one implementation, the bitstream may include the line index indicating the selected at least one of the reference lines and the MPM index indicating one of the MPMs, when the encoder module 812 may first encode into the bitstream the line index indicating that the selected at least one of the reference lines includes one of the reference lines different from the predefined reference line.

In at least one implementation, the encoder module 812 may first encode the mode flag into the bitstream. In at least one implementation, the selected at least one of the reference lines is the predefined reference line, when the prediction mode is selected from the remaining mode candidates. Thus, there may be no line index in the bitstream, when the mode flag indicates that the prediction mode is included in the remaining mode candidates. In at least one implementation, the bitstream may include the mode flag and the non-MPM index for determining on of the remaining mode candidates and the predefined reference line, when the encoder module 812 may first encode into the bitstream the mode flag indicating that the prediction mode is included in the remaining mode candidates. In at least one implementation, the selected at least one of the reference lines may be the predefined reference line or include one of the reference lines different from the predefined reference line, when the prediction mode is selected from the MPMs. Thus, the bitstream includes the line index to indicate the selected at least one of the reference lines, when the mode flag indicates that the prediction mode is included in the MPMs. In at least one implementation, the bitstream may include the line index indicating the selected at least one of the reference lines and the mode flag and the MPM index indicating one of the MPMs, when the encoder module 812 may first encode into the bitstream the mode flag indicating that the prediction mode is included in the MPMs.

In at least one implementation, the encoder module 812 may perform the line quantity determination method as shown in FIG. 7. The method in FIG. 7 may be carried out using the configurations illustrated in FIG. 1 and FIG. 8, for example, and various elements of these figures are referenced in explaining the example method. Furthermore, the order of blocks in FIG. 7 is illustrative only and may change. Additional blocks may be added or less blocks may be utilized without departing from the present disclosure.

At block 71, the encoder module 812 determines a block size of a block unit from an image frame according to video data.

In at least one implementation, the video data may be a video. The source device 11 may receive the video by the source module 111. The encoder module 812 determines the image frame from the video, and divides the image frame to determine the block unit.

In at least one implementation, the prediction process unit 8121 of the source device 11 determines the block unit having the block size from the video via the partition unit 81211, and then the encoder module 812 provides a plurality of partition indications into a bitstream based on a partition result of the partition unit 81211. In at least one implementation, the block size may include a block height H and a block width W.

At block 72, the intra prediction unit 81212 determines a number of one or more reference lines based on the block size.

In at least one implementation, the prediction process unit 2222 of the destination device 12 determines the block unit from the video data via the entropy decoding unit 2221, and determines the one or more reference lines neighboring to the block unit.

In at least one implementation, the prediction process unit 2222 determines the number of the one or more reference lines based on a size comparison generated based on the block size and a size threshold. In at least one implementation, the number of the one or more reference lines is equal to a predefined quantity greater than one, when the prediction process unit 2222 determines that the size comparison satisfies a predefine condition. In at least one implementation, the number of the one or more reference lines is equal to one, when the prediction process unit 2222 determines that the size comparison does not satisfy the predefined condition. In at least one implementation, the predefined condition may include at least one of a first condition that the block size is less than a first threshold, a second condition that the block size is greater than a second threshold different from the first threshold, a third condition that a size ratio determined based on the block width W and the block height H of the block size is less than a third threshold, a fourth condition that the size ratio is equal to a fourth threshold different from the third threshold, and any other size comparison conditions.

At block 73, the intra prediction unit 81212 selects one of the one or more reference lines based on the number of the one or more reference lines.

In at least one implementation, the intra prediction unit 81212 may select one of the one or more reference lines to predict the block unit, when the number of the one or more reference lines is greater than one. In at least one implementation, the intra prediction unit may directly use the one or more reference lines to predict the block unit, when the number of the one or more reference lines is equal to one.

At block 74, the intra prediction unit 81212 predicts the block unit based on the selected one of the one or more reference lines.

In at least one implementation, the block unit may include a plurality of block components. In the implementation, each of the block components may be a pixel element. In at least one implementation, the intra prediction unit 81212 may determine, according to one of a plurality of intra prediction modes, one of a plurality of predicted components based on the selected one of the one or more reference lines for each of the block components. In at least one implementation, the intra prediction unit 81212 may select another one of the one or more reference lines to predict the block unit according to the intra prediction modes.

In at least one implementation, the intra prediction unit 81212 may predicts the block unit based on the one or more reference lines according to the intra prediction modes to generate a plurality of predicted results. In at least one implementation, the prediction process unit 8121 may select one of predicted results based on a mode selection method, such as a cost function. In at least one implementation, the mode selection method may be a rate-distortion optimization (RDO) process. In the implementation, the prediction process unit 8121 sets one of the intra prediction modes and one of the one or more reference lines used to generate the selected coding result as a prediction mode of the block units.

In at least one implementation, the encoder module 812 predicts the block unit to generate a plurality of residual samples based on the predicted components, and provide the bitstream including a plurality of coefficients corresponding to the residual samples.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
   determining a block unit from an image frame according to the bitstream;
   determining a line index of the block unit in the bitstream;
   comparing the line index with a first predefined value to determine whether a mode flag is included in the bitstream;
   determining a mode index in the bitstream for directly selecting a prediction mode of the block unit from a most probable mode (MPM) list of the block unit when the mode flag is not included in the bitstream;
   comparing the mode flag to a second predefined value when the mode flag is included in the bitstream to determine whether the prediction mode is selected from the MPM list based on the mode index;
   selecting one of a plurality of reference lines based on the line index; and
   reconstructing the block unit based on the selected one of the plurality of reference lines and the prediction mode.

2. The method according to claim 1, wherein the prediction mode of the block unit is selected from a plurality of mode candidates based on the mode flag when the selected one of the plurality of reference lines is identical to a first one of the plurality of reference lines adjacent to the block unit and indicated by the first predefined value.

3. The method according to claim 2, wherein:
   the plurality of mode candidates is categorized into the MPM list and a non-MPM list; and
   the mode flag indicates in which one of the MPM list and the non-MPM list the prediction mode is included.

4. The method according to claim 2, wherein the prediction mode is selected based on the mode index from the MPM list without parsing the mode flag when the selected one of the plurality of reference lines is different from the first one of the plurality of reference lines.

5. An electronic device for decoding a bitstream, the electronic device comprising:
   at least one processor; and
   a storage device coupled to the at least one processor and storing a plurality of instructions which, when executed by the at least one processor, causes the at least one processor to:
      determine a block unit from an image frame according to the bitstream;
      determine a line index of the block unit in the bitstream;
      compare the line index with a first predefined value to determine whether a mode flag is included in the bitstream;
      determine a mode index in the bitstream for directly selecting a prediction mode of the block unit from a most probable mode (MPM) list of the block unit when the mode flag is not included in the bitstream;
      compare the mode flag to a second predefined value when the mode flag is included in the bitstream to determine whether the prediction mode is selected from the MPM list based on the mode index;
      select one of a plurality of reference lines based on the line index; and
      reconstruct the block unit based on the selected one of the plurality of reference lines and the prediction mode.

6. The electronic device according to claim 5, wherein the prediction mode of the block unit is selected from a plurality of mode candidates based on the mode flag when the selected one of the plurality of reference lines is identical to a first one of the plurality of reference lines adjacent to the block unit and indicated by the first predefined value.

7. The electronic device according to claim 6, wherein the prediction mode is selected from the MPM list including a plurality of most probable modes determined from the plurality of mode candidates when the selected one of the plurality of reference lines is different from the first one of the plurality of reference lines.

8. A method of decoding a bitstream by an electronic device, the method comprising:
   determining a block unit from an image frame according to the bitstream;
   determining a line index in the bitstream for selecting a prediction line of the block unit from a plurality of reference lines;
   determining, based on the line index, whether a mode flag is included in the bitstream;
   directly determining a most probable mode (MPM) index from the bitstream for selecting a prediction mode of the block unit from an MPM list of the block unit when the mode flag is not included in the bitstream;
   comparing the mode flag with a predefined value for selecting one of the MPM index and a non-MPM index to determine the prediction mode when the mode flag is included in the bitstream; and
   reconstructing the block unit based on the prediction line and the prediction mode.

9. The method according to claim 8, wherein:
   the mode flag is included in the bitstream for indicating the selected one of the MPM index and the non-MPM index when the prediction line indicated by the line index is identical to a first one of the plurality of reference lines, and the first one of the plurality of reference lines is adjacent to the block unit.

10. The method according to claim 9, wherein the prediction mode is selected directly based on the MPM index from the MPM list without parsing the mode flag when the prediction line is different from the first one of the plurality of reference lines.

11. The method according to claim 9, wherein the mode flag is not included in the bitstream when the prediction line is different from the first one of the plurality of reference lines.

* * * * *